United States Patent [19]
> Mittelbach et al.

[11] Patent Number: 4,979,227
[45] Date of Patent: Dec. 18, 1990

[54] METHOD FOR AUTOMATIC CHARACTER RECOGNITION EMPLOYING A LEXICON HAVING UPDATED CHARACTER STRINGS

[75] Inventors: Helmut Mittelbach, Konstanz; Xaver Mueller, Radolfzell; Peter Schlegel, Konstanz, all of Fed. Rep. of Germany

[73] Assignee: Computer Gesellschaft Konstanz mbH, Fed. Rep. of Germany

[21] Appl. No.: 257,762

[22] Filed: Oct. 14, 1988

[30] Foreign Application Priority Data

Oct. 16, 1987 [DE] Fed. Rep. of Germany ....... 3735139

[51] Int. Cl.$^5$ .............................................. G06K 9/72
[52] U.S. Cl. ....................................... 382/40; 382/14; 382/57
[58] Field of Search ....................... 382/40, 57, 69, 30, 382/1, 14, 15, 16; 364/900, 32 A, 32 B, 750 B, 751, 43 A

[56] References Cited

U.S. PATENT DOCUMENTS

| | | | |
|---|---|---|---|
| 3,492,653 | 1/1970 | Fosdick et al. | 340/172.5 |
| 3,651,459 | 3/1972 | Hahn | 340/146.3 |
| 3,873,972 | 3/1975 | Levine | 382/14 |
| 3,969,700 | 7/1976 | Bollinger et al. | 382/57 |
| 4,177,448 | 12/1979 | Brayton | 382/14 |
| 4,328,561 | 5/1982 | Convis et al. | 382/40 |
| 4,799,271 | 1/1989 | Nagasawa et al. | 382/40 |

FOREIGN PATENT DOCUMENTS 1201178 8/1970 United Kingdom .

OTHER PUBLICATIONS

Association for Computing Machinery, Proceedings of the 19th National Conference, Aug. 25-27, 1964; "The Use of Context for Correcting Garbled English Text", by Charles M. Vossier et al., pages D2.4-1 through D2.4-13.

Primary Examiner—Michael Razavi
Attorney, Agent, or Firm—Hill, Van Santen, Steadman and Simpson

[57] ABSTRACT

In a method for automatic character recognition, character strings marked by word start and word end are formed from the discrete characters calculated with the assistance of a character classifier. These character strings are checked with stored comparison strings of a context lexicon with respect to identity or similarity. The context lexicon is continuously updated by continuous read-in of strings containing no rejection characters, whereby the repeated read-in of identical strings is counted. Current strings are compared to the strings of the context lexicon and that string which is optimum with respect to similarity and frequency is selected for further evaluation. A correction provided with reference to the context comparison is only executed when the substitution transposition is probable based on the classifier characteristic for the characters under consideration.

1 Claim, 2 Drawing Sheets

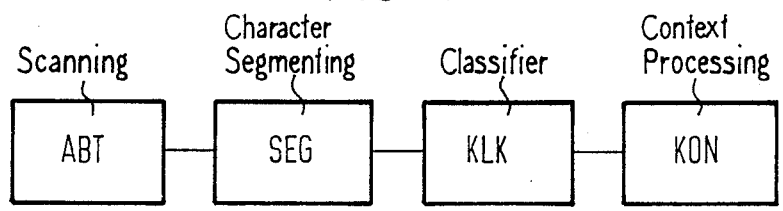
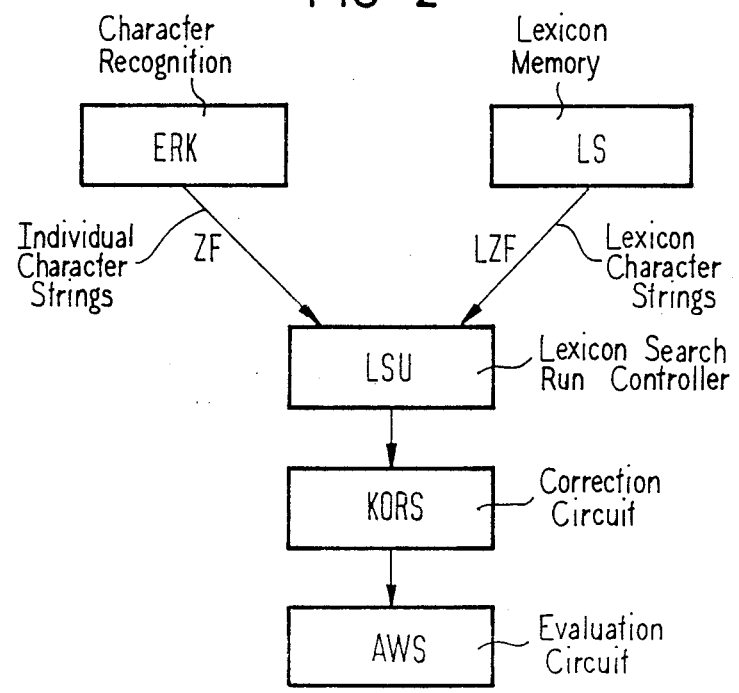

METHOD FOR AUTOMATIC CHARACTER RECOGNITION EMPLOYING A LEXICON HAVING UPDATED CHARACTER STRINGS

BACKGROUND OF THE INVENTION

The invention is directed to a method for automatic character recognition.

In contrast to character recognition by man, who normally does not view the characters of a character string in isolation but places them into contextual relationship with the neighboring characters, for a long time automatic character recognition was exclusively limited to the recognition of discrete characters. Despite what has become a high recognition reliability in discrete character classification, it has quickly become evident that a further performance enhancement is only possible when the context is involved in the recognition process. With the assistance of the context, substitutions and rejections (i.e. characters that were incorrectly recognized or not recognized at all) can be recognized as errors and may also be subsequently corrected in a fashion coming extremely close to human perception.

A known context method (see VDE-Fachberichte, 30/1978, pages 195 through 206, incorporated herein by reference), for example, provides that the character classifier respectively offers a plurality of alternatives for characters of a character string that were not clearly recognizable, a series of alternative character strings being then formed therefrom. Finally, these alternative character strings are compared to permissible words that were previously deposited in a lexicon memory, whereby the alternative character string coinciding with a permissible lexicon word is ultimately selected. Although the recognition reliability can be fundamentally enhanced in this way, such a method has the disadvantage that only character strings whose legitimate comparison words were stored in the lexicon can be corrected in this way.

SUMMARY OF THE INVENTION

It is an object of the present invention to improve a character recognition method by use of a context processing such that the lexicon needed for the context comparison is not bound to permanently prescribed memory entries, but, based on its dynamic behavior, can be adapted to newly occurring character strings in a relatively easy fashion so that read results that are better overall can be achieved in comparison to the prior art.

The advantages of this method of the invention are first, that the context lexicon is not bound to a permanently prescribed content but is continuously updated with the assistance of the respective character strings newly entered both in the set-up phase as well as in the actual correction phase, with the special characteristic that the respective character strings need not necessarily be "meaningful" relative to the orthography or grammar of a language. The method of the invention is therefore not bound to a specific language, but can be applied to any arbitrary character string within the character set recognizable by the classifier.

BRIEF DESCRIPTION OF THE DRAWINGS

FIG. 1 is a fundamental structure of a character recognition means having context processing;

FIG. 2 illustrates in block diagram flow chart format the principle of a context processing of the invention.

DESCRIPTION OF THE PREFERRED EMBODIMENTS

Figure 3:
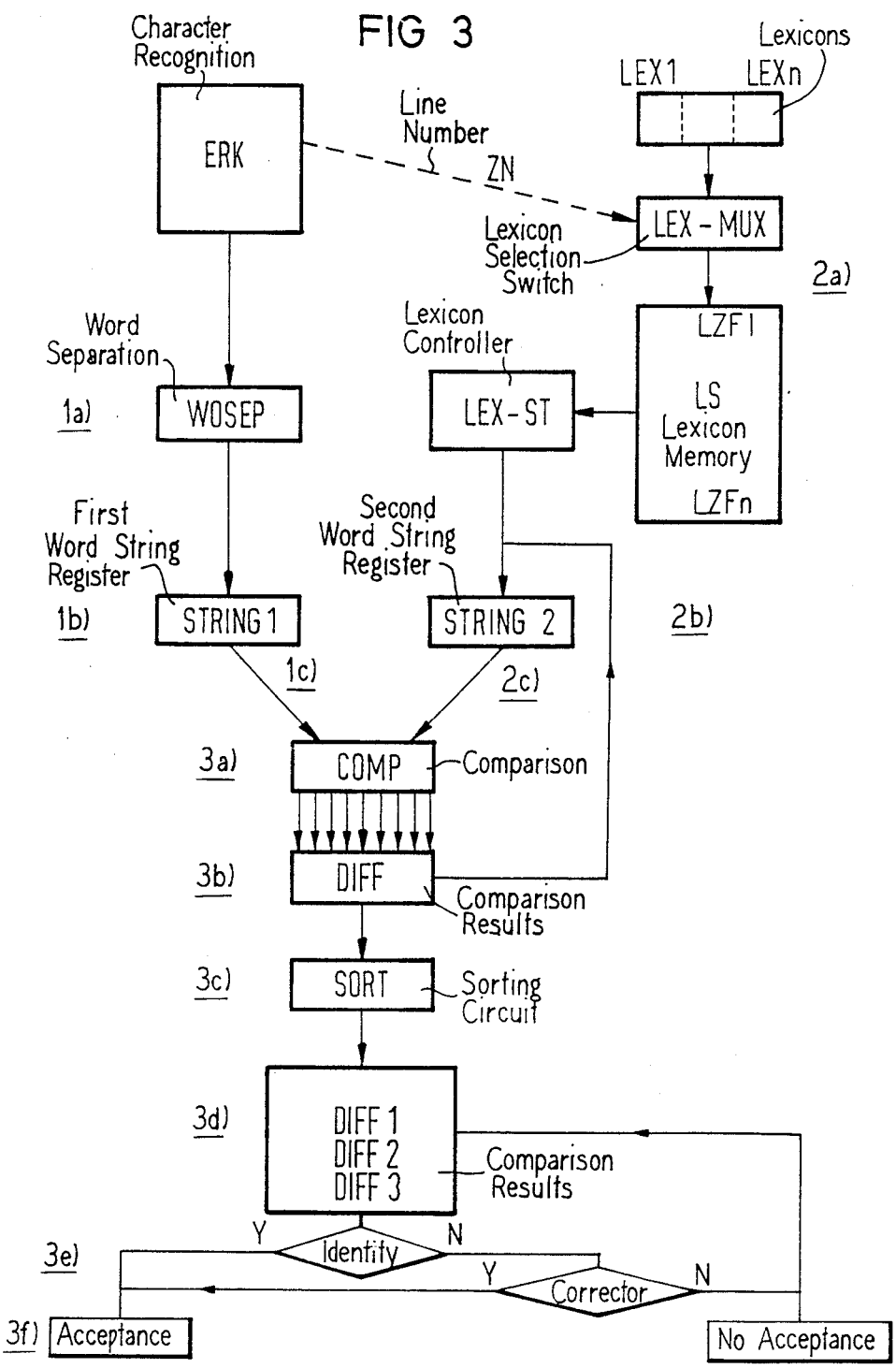
FIG. 3 is a detailed block diagram for implementation of each of the steps of a context method of the invention.

The block circuit diagram shown in FIG. 1 shows the basic elements of a means for automatic character recognition comprising a scanning means ABT, a character segmenting means SEG, and a classifier means KLK which executes a discrete character recognition based on the scanned and segmented image patterns, and which assigns the respective image patterns to one of n character classes within the character set. This discrete character classification is followed by a context processing means KON that now considers the discrete characters output by the classifier in context in order to achieve a greater recognition reliability on the basis of a comparison to lexically stored, identical or very similar character strings.

As shown in FIG. 2, the context method is fundamentally executed such that individual character strings ZF are compiled in a character recognition means ERK, for example from optically read data of a document. These individual character strings ZF are compared to lexicon character strings LZF which comprise a lexicon deposited in a lexicon memory LS. The generation of this lexicon occurs in such fashion that character strings that contain no rejections and which are with a high probability free of substitutions are selected from continuously read document data in a set-up phase that precedes the actual context method. Moreover, the respective frequency of identical character strings is registered in the lexicon. The actual context method begins as soon as the lexicon is created, whereby a plurality of optimally similar or identical character strings LZF are output from a lexicon search run controller LSU from the lexicon character strings read from the lexicon memory LS for a respectively current character string ZF. The best lexicon character string LZF is finally selected in a following correction circuit KORS and a rejection or substitution correction as well as a potential final word rejection is carried out with the assistance of an evaluation circuit AWS if there is no identity, but only a greater or lesser similarity.

Further details of the context method shall be set forth below with reference to FIG. 3. It is assumed that the document to be read comprises a plurality of lines to which different significance contents are allocated. A separate context lexicon or a part of an overall context lexicon, for example, can then be allocated to each of these lines.

The following method steps will now be described wherein each method step is separately numbered hereafter in accordance with corresponding step numbers shown in FIG. 3.

1a. From the respectively read line of the document, a word separation circuit WOSEP forms character strings referred to as word strings. Such word separation occurs by identification of word start and word end in WOSEP.

1b. The marked word string is transferred from the word separation circuit WOSEP and is loaded into the first word string register STRING 1.

2a. Lexicon selection occurs based on the location on the document acquired by the scanner. Controlled by a line number ZN, one of a plurality of lexicons LEX1..-.LEX$_n$ is selected via a lexicon selection switch LEX-MUX and the content thereof is transferred into a lexicon LS.

2b. One individual lexicon character string LZF (one of the character strings LZF1...LZF$_n$) are transferred from the lexicon memory LS into a second word string register STRING 2 with the assistance of a lexicon controller LEX-ST.

2c. The outputs of the two registers STRING 1 and STRING 2 are each connected to an input of comparison means COMP. One respective lexicon character string LZF (which is a hypothesis), is transferred from the second word string register STRING 2 to the comparison means COMP.

3a. The comparison means COMP now compares the respective current string now being read to a plurality of comparison strings from the lexicon memory LS. More specifically, the word string from STRING 1 and the one lexicon character string LZF (functioning as a hypothesis) from STRING 2 are compared with respect to
   identity
   similarity
   similarity, but the one lexicon character string LZF has rarely occurred up to now (low frequency)
   no identity.
The comparison results are known as DIFF.

3b. Storing the comparison results DIFF.

3c. Selecting the three best comparison results in a following sorting circuit SORT on the basis of the individual comparison results DIFF. The frequency index for the respective corresponding lexicon character string LZF is allocated to every comparison result.

3d. The selected comparison results are stored in DIFF 1, 2, 3.

3e. The selected comparison results are now evaluated. That is, during the comparison between the current string and the selected lexicon string (hypothesis), the respective correctability is discriminated according to the following criteria based on identities and classifier-associated substitution transpositions between the read string and a hypothesis as well as on the occurrence probability of the hypothesis:
   identify—hypothesis and string are identical;
   similarity—hypothesis and string are very similar, and similarity being determined through involvement of the classification decision (see examples cited hereafter wherein the classifier initially incorrectly reads the "H" of HEIDELBERG as "M"). "H" was only the second-best statement. As a result of the context comparison that decides in favor of "H", that confirms a similarity of "M" and "H". "M" is corrected to read "H".

3f. Acceptance of the word string that has been read and that has been confirmed as correct by identity
   acceptance of the context correction taking the classifier characteristic into consideration
   no acceptance (rejection).
Thus, a context statement is made in the comparison of the hypothesis to one another, whereby various correction alternatives come into consideration dependent on the quality of the best possible comparison result DIFF with reference to frequency and identity/similarity.

Given identity between hypothesis and string, this, for example, means that the current character string is accepted as unambiguously recognized. The situation is different given correction wherein the string and hypothesis are in fact very similar but not identical. A check is carried out here to the effect that the classifier characteristic is involved in the recognition process. When, for example, the context processing has corrected a handwritten "M" into an "H", then this correction will be confirmed by the classifier in view of the similarity of the two characters; by contrast thereto, for example a correction of "M" into "C" would have to be rejected as improbable on the basis of the classifier characteristic.

Examples of rejection and/or substitution corrections shall be presented below.

Example 1 is directed to a rejection correction:

| STRING 1 | STRING 2 |
|---|---|
| G I E * S E N | Hypothesis |
| | G I E S S E N |
| | S I E G E N |
| | G I E N G E N |
| | H E S S E N |

The context handling here results in the character string GIE*SEN (rejection of the letter S), output by the classifier, as being corrected to read GIESSEN.

The second example is related to a substitution correction:

| STRING 1 | STRING 2 |
|---|---|
| M E I D E L B E R G | Hypothesis |
| | M E D A I L L E N |
| | M E U L E N B E R G |
| | H E I D E L B E R G |
| | F R I E D B E R G |
| | F E H L E N B E R G |

Here, the context correction circuit decides in favor of hypothesis three, i.e. in favor of HEIDELBERG. This correction is supported by the classifier characteristic that considers the change of "M" into "H" to be permitted. The analogous case would not be possible given a decision in favor of FRIEDBERG because, for example, the classifier would never allow the change of "M" into "F".

The third example relates to a rejection and substitution correction:

| STRING 1 | STRING 2 |
|---|---|
| * I C A A E L | Hypothesis |
| | R E I C H E L T |
| | M I C H A E L |
| | M I C H E L |
| | B I C K E L |

Here, the context correction circuit will decide in favor of MICHAEL, particularly since the classifier will accept the similarity between "A" and "H".

Although various minor changes and modifications might be proposed by those skilled in the art, it will be understood that we wish to include within the claims of the patent warranted hereon all such changes and modifications as reasonably come within our contribution to the art.

We claim as our invention:

1. A method for automatic character recognition, comprising the steps of:
   acquiring character strings by scanning and automatic character recognizing an image pattern, each character string being marked by a word start and a word end;
   generating a lexicon by determining which character strings contain no rejection characters and storing and continuously updating the character strings containing no rejection characters, and recording a frequency of occurrence of identical character strings;
   comparing each of the character strings to be checked, including character strings having rejection and substitution characters, to the stored character strings of the lexicon, and identifying a plurality of identical or optimally similar lexicon character strings corresponding to the character string being checked;
   selecting a lexicon character string that is optimum with respect to similarity and frequency to the character string being checked; and
   executing a correction, if necessary, of the character string being checked by comparison to the lexicon character string when a correction is probable for the character string being checked.

* * * * *